Aug. 20, 1968  A. H. GUENTHER  3,398,322
HIGH VOLTAGE SWITCH
Filed Sept. 17, 1964  5 Sheets-Sheet 3

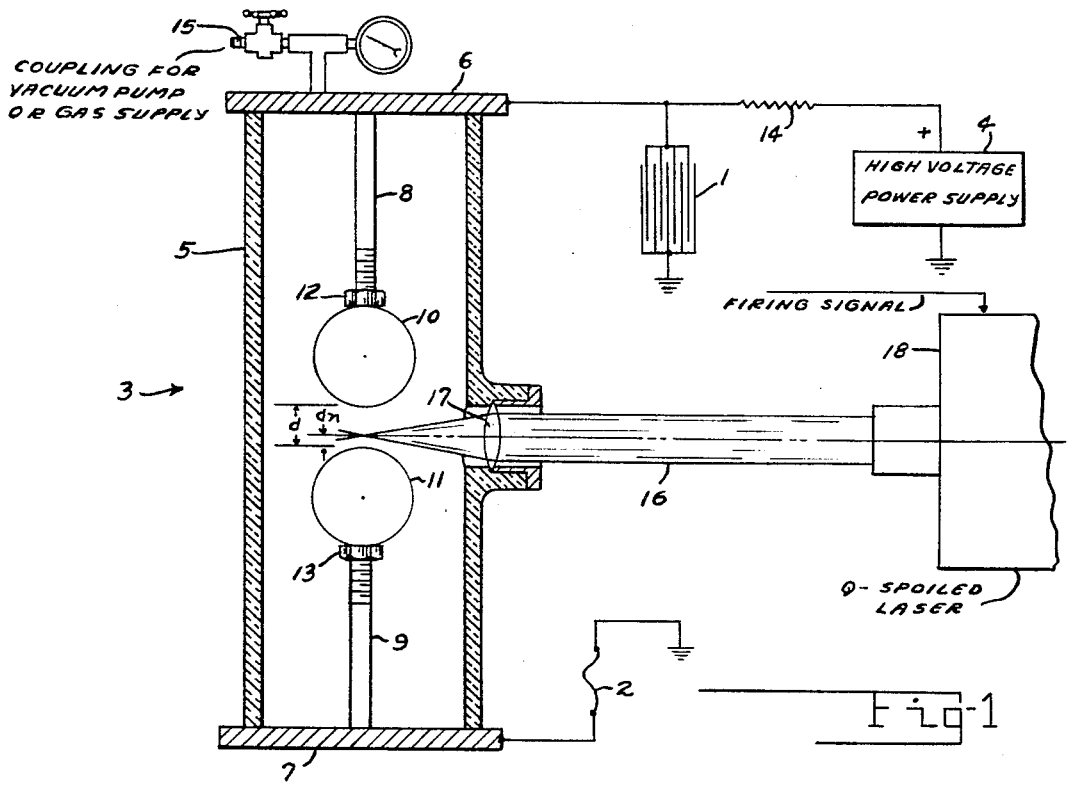
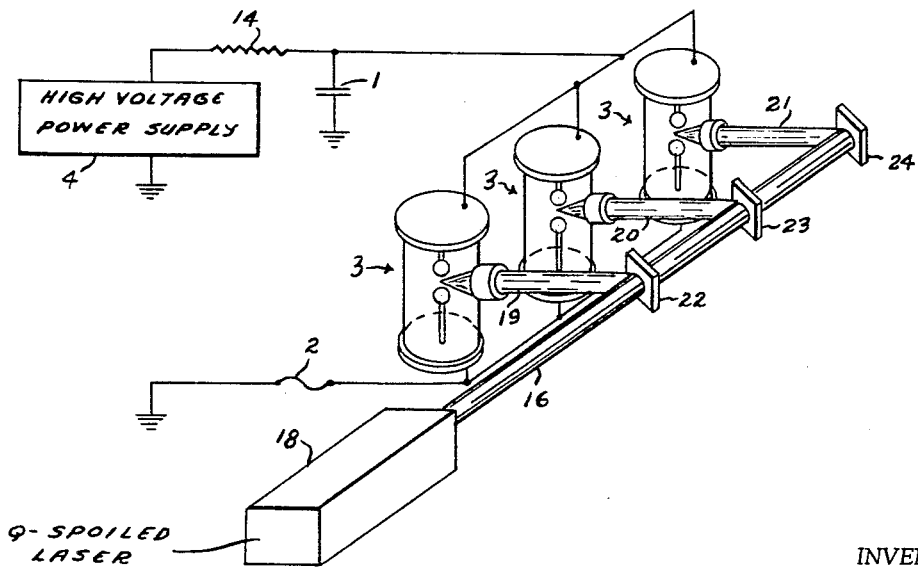

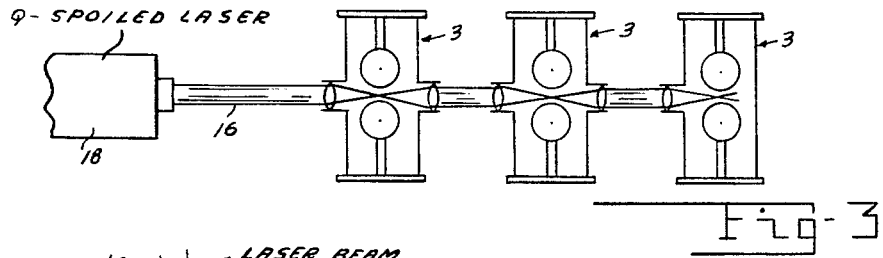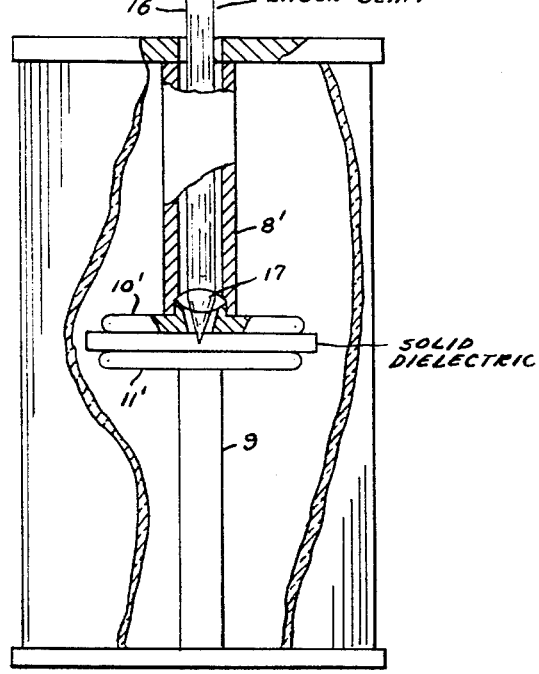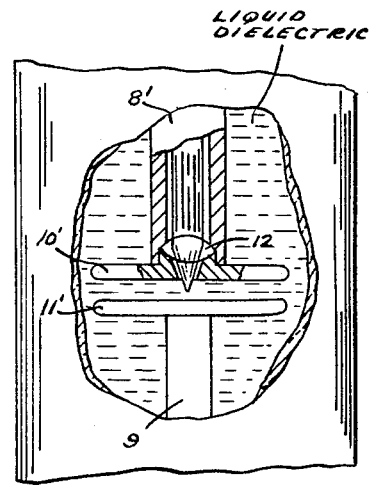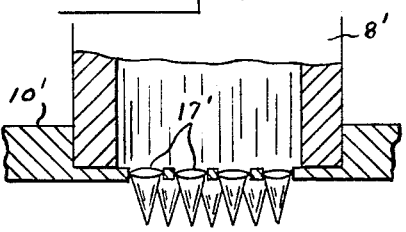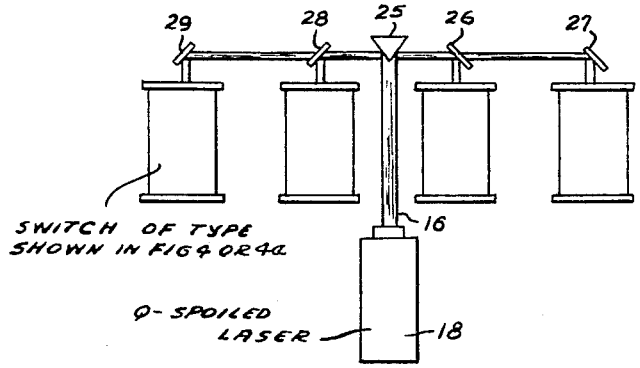

INVENTOR
A. H. GUENTHER

BY
ATTORNEY

AGENT

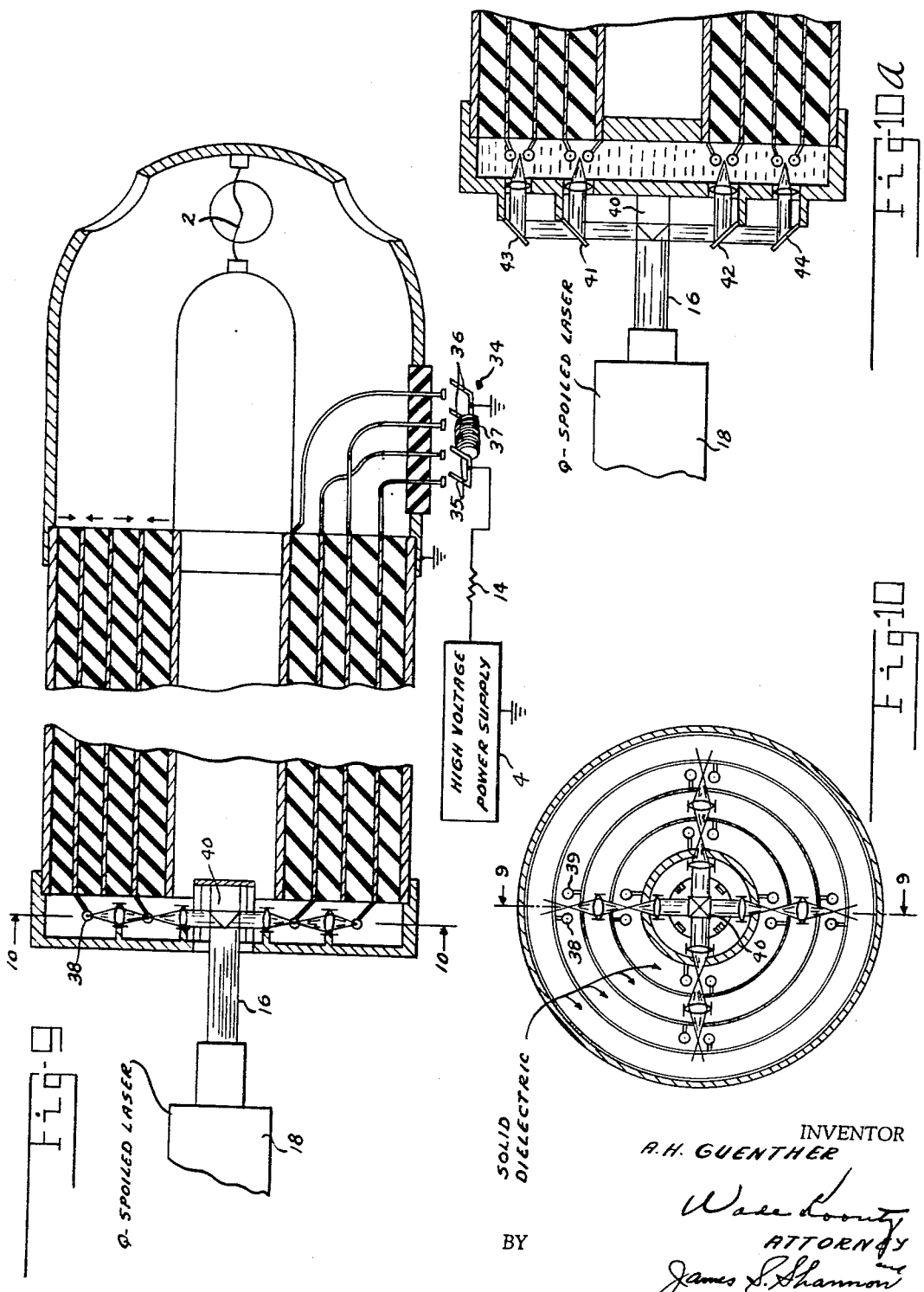

Aug. 20, 1968  A. H. GUENTHER  3,398,322
HIGH VOLTAGE SWITCH

Filed Sept. 17, 1964

INVENTOR
A. H. GUENTHER
BY
ATTORNEY
AGENT

United States Patent Office 3,398,322
Patented Aug. 20, 1968

3,398,322
HIGH VOLTAGE SWITCH
Arthur H. Guenther, Albuquerque, N. Mex., assignor to the United States of America as represented by the Secretary of the Air Force
Filed Sept. 17, 1964, Ser. No. 397,345
7 Claims. (Cl. 315—150)

The invention described herein may be manufactured and used by or for the United States Government for governmental purposes without the payment to me of any royalty thereon.

In certain laboratory studies into such phenomena as nuclear explosions, high temperature plasmas, field emission of electrons, etc., it is desirable to apply large amounts of electrical energy to a transducer in a very short interval of time for conversion into other forms such as thermal, kinetic or radiant energy. The transducer may be a piece of wire or foil, or a field emission device, depending upon the effect to be investigated. The electrical energy is initially stored in a suitable storage device such as a high voltage capacitor or field reversal pulse forming line system which is charged over a relatively long period of time from a relatively low current source. The object is to discharge this energy through the transducer in the smallest possible interval of time. This requires that the electrical coupling between the storage device and the transducer have a minimum of resistance and inductance and, preferably, that it provide a good impedance match between the storage device and transducer.

Where the storage device is a capacitor, a normally open switch must be inserted between the capacitor and the transducer so that the transducer is disconnected while the capacitor is being charged. Discharge of the capacitor through the transducer is then effected by closing the switch. Where the storage device is a field reversal pulse forming line system, to be described later, a switch is not required between the line system output and the transducer, but a plurality of normally open short-circuiting switches must be provided for one half of the total number of lines in the system. Discharge of the line system through the transducer is effected by simultaneously closing the short-circuiting switches.

The magnitude of the voltages and currents involved places stringent requirements on the design of the switches. In carrying out the above mentioned studies, the electrical energy stored in the storage device may amount to thousands or even hundreds of thousands of joules, the voltage may be in the megavolt region and the current, although of short duration, may be a million amperes or more. Where the storage device is a capacitor, the switch that connects the capacitor to the transistor must withstand the total voltage to which the capacitor is charged. In the case of a field reversal pulse forming line system, the voltage to which the shorting switches are subjected is not as great, but, nevertheless, may be of the order of hundreds of kilovolts.

In addition to the high voltage and current requirements, there are other requirements that a switch for the above described use should meet. It should have very low resistance so as not to limit the current and a very low inductance in order to minimize the rise time and pulse width. The switching delay, i.e. the time interval between the initiating act and the actual start of current flow, should be much less than a microsecond and preferably only a few nanoseconds. Also, the variation in this delay, referred to as jitter, should be an absolute minimum and preferably no more than one nanosecond since, where switches are connected in parallel to reduce inductance and resistance, or where a plurality of shorting switches are used in a pulse forming line system, precise synchronization is necessary. Further, the switch should be simple and require a minimum of maintenance. Finally, in view of the high voltages and currents involved, the switch should be inherently safe to operate.

It is the object of this invention to provide a switch for the above described use that meets the above requirements. Briefly, the switch comprises a spark gap, set to have a self-breakdown voltage greater than the open switch voltage, in which breakdown is triggered by bringing a short pulse of radiation from a powerful laser to focus at a point or points between the electrodes of the gap. The dielectric in the gap may be a gas such as air, $N_2$ or $SF_6$, a liquid such as a dielectric oil, or a solid such as polyethylene or Mylar. The great concentration of light energy in the gap causes complete breakdown of the gap to occur in much less than a microsecond, and under proper conditions only a few nanoseconds, after arrival of the radiation pulse at the focal point. Since there is no physical connection between the switch operating controls at the laser and the switch, the switch is inherently safe to operate.

A more detailed description of the invention will be given with reference to the specific embodiments thereof shown in the accompanying drawings in which:

FIG. 1 illustrates a switch in accordance with the invention used with a storage device in the form of a capacitor;

FIGS. 2 and 3 illustrate the simultaneous operation of a plurality of paralleled switches of the type shown in FIG. 1;

FIGS. 4 and 4a show the switch as designed for use with solid and liquid dielectrics, respectively;

FIG. 4b shows a modification of FIG. 4 or 4a providing multiple parallel discharge paths;

FIG. 5 illustrates the simultaneous actuation of a plurality of switches of the type shown in FIG. 4 or FIG. 4a;

FIGS. 9, 10 and 10a illustrate the use of switches in accordance with the invention in an electrical energy storage device of the field reversal transmission line type.

Figure 6:
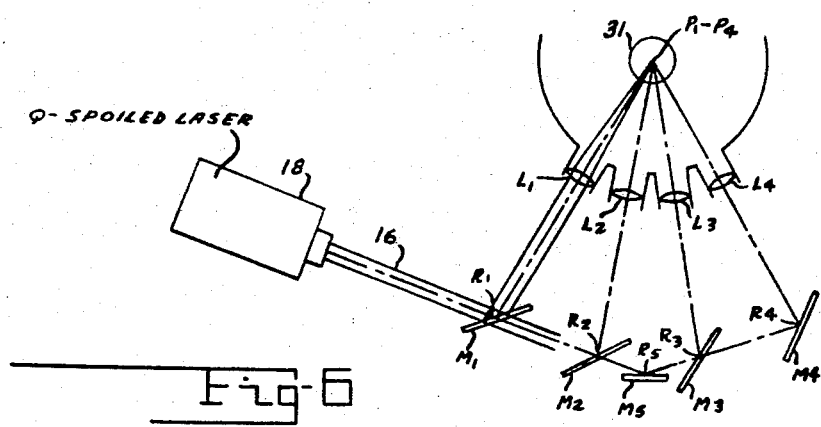
FIGS. 6, 7 and 8 illustrate a method of bringing the laser energy to focus at a plurality of points in the spark gap.

Referring to the drawing, FIG. 1 illustrates a high voltage switch in accordance with the invention and one of its applications. Here it is desired to discharge a high voltage storage capacitor 1 through transducer 2, which in this case is a wire, in the minimum amount of time. For this purpose, transducer 2 is connected to the capacitor 1 through normally open high voltage switch 3. With the switch 3 open, capacitor 1 charges over a relatively long period of time from high voltage power supply 4 through resistor 14 which may be the internal resistance of the source. Switch 3 is then closed to discharge the capacitor through the transducer. As stated earlier, the energy stored in capacitor 1 may be thousands or even hundreds of thousands of joules and the voltage may be in the megavolt range. The object is to explode the wire 2 by the application thereto of this very large amount of energy over a very small interval of time. The time required to discharge the capacitor through the wire is directly related to the resistance and inductance in the discharge circuit and, therefore, switch 3 must introduce a minimum of these factors.

Switch 3 comprises a gas tight enclosure which may be made up of a cylindrical portion 5 of glass or other suitable insulating material and metallic end plates 6 and 7. The end plates 6 and 7 serve also as terminals for connecting the switch into an electrical circuit. Conductive rods 8 and 9 extend from the end plates and terminate in spherical electrodes 10 and 11 wich may be made of stainless steel, for example. Electrodes 10 and 11 are threaded to the supporting rods and held in place by lock nuts 12 and 13 so that the gap spacing $d$ as well as the gap position along the axis of cylinder 5 may be adjusted. The spacing $d$ is so adjusted that the self-breakdown voltage of the spark gaps formed by electrodes 10 and 11 is slightly greater than the voltage at which the energy is stored in capacitor 1. The self-breakdown voltage will depend upon the dielectric in the gap. The switcth 3 of FIG. 1 is designed for a gaseous dielectric so that the self-breakdown voltage depends upon the gas used and its pressure. Air, $N_2$ and $SF_6$ are suitable gases for this purpose. When a gas other than air is used the air may first be removed from the switch by a vacuum pump connected to coupling 15.

The switch 3 is closed by effecting breakdown of the spark gap. In accordance with the invention this is accomplished by bringing the coherent light beam of a powerful laser to focus at a point within the gap. Preferably, this point should lie on the line between the closest points of electrodes 10 and 11 and the distance $d_n$ between the focal point and the cathode, electrode 11 in FIG. 1, should be small and may be zero with the beam brought to focus on the surface of the cathode. In FIG. 1, the focusing of the beam 16 is accomplished by lens 17, the optical axis of which preferably intersects the line between the centers of spheres 10 and 11 and is normal thereto. The distance $d_n$ may be adjusted without changing the gap spacing $d$ through moving spheres 10 and 11 equal amounts in the same direction by means of their threaded attachments to rods 8 and 9, or it may be adjusted by tilting the laser beam axis.

The laser 18 should be of a type providing a very high intensity coherent light pulse of very short duration. Presently known lasers employing Q-spoiling techniques meet this requirement. The construction and operation of Q-spoiled lasers is well known in the art and need not be described in detail here. Briefly, in lasers of this type, the optical cavity consisting of the laser crystal and the light reflecting surfaces at each end is made non-oscillatory by making ineffective one of the reflecting surfaces until the crystal has been pumped to a critical high energy level. At this instant the reflecting surface is made effective and the optical cavity becomes resonant, with the result that the laser emits a single coherent light pulse of very high energy and very short duration. The rotating prism and the Kerr cell shutter are two presently employed techniques for making the reflecting surface effective at the proper instant. In the case of the rotaing prism, which acts as the reflecting surface, the pumping light source is energized at the proper experimentally determined point in the rotational cycle of the prism to provide maximum output. In the case of the Kerr cell shutter, a delay is introduced between energization of the pumping light source and the opening of the shutter that is experimentally determined to provide maximum output. Q-spoiled lasers are capable of beam powers in excess of $10^9$ watts and when focused by a lens to a spot size of approximately .01″ in diameter can produce power densities in excess of $10^{12}$ watts/cm.$^2$ with pulses in the 5–20 nanosecond region. The higher beam powers are of value when beam splitting techniques are required as explained later.

The theory of electrical discharges is still not firmly established and therefore the exact mechanism by which breakdown is initiated by the focused laser radiation cannot be given. However, it appears certain that field distortion, ionization and the photoemission of electrons brought about by the great concentration of energy at the focal point of the laser beam are the principal causative factors.

Figure 11:
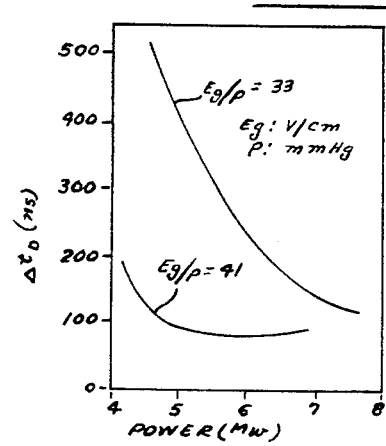
FIGS. 11 through 15 illustrate the effect of various parameters on the switching delay.
Figure 12:
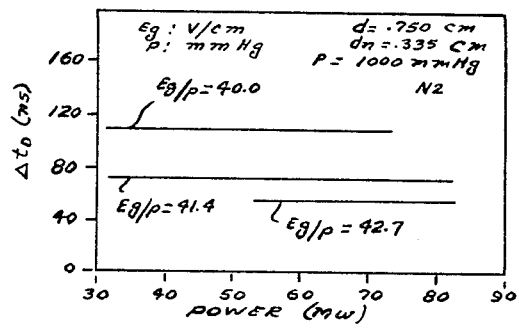
Figure 13:
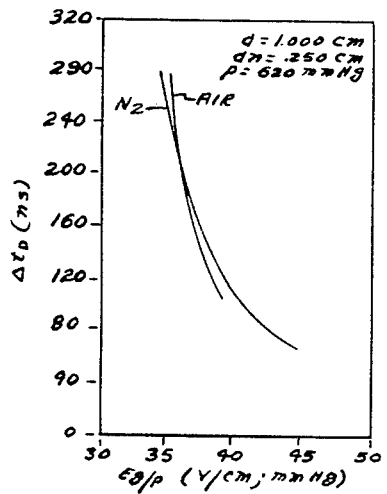
Figure 14:
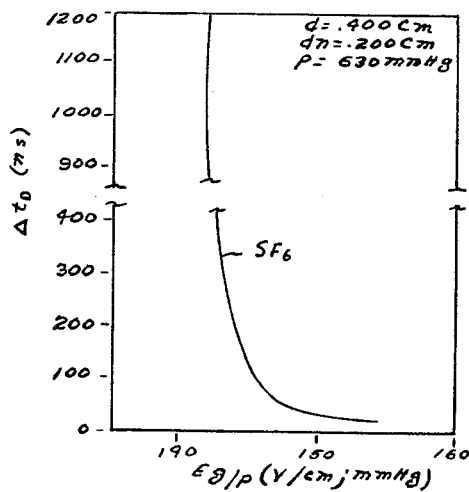
Figure 15:
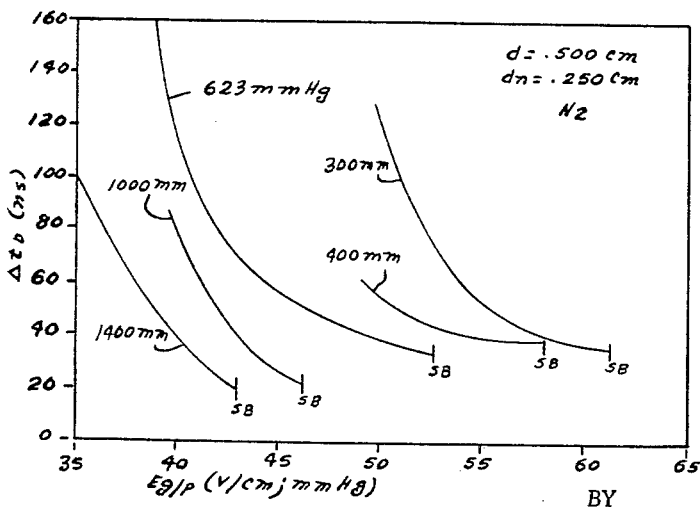

The time interval $\Delta t_D$ is the delay between the arrival of the laser pulse at the focal point in the gap and the initiation of current flow across the gap. FIGS. 11–15 show this delay for various parameters. FIG. 11 illustrates how $\Delta t_D$ varies with laser beam power for two values of $Eg/p$, where $Eg$ is the electric field strength in the gap (volts/cm.) and $p$ is the gas pressure in the gap (mm. of Hg). FIG. 12 shows this relationship for high values of laser beam power. At low values of beam power it is seen that $\Delta t_D$ decreases rapidly as the power is increased, but is substantially independent of beam power at the higher values. FIGS. 13 and 14 show the relationship between $\Delta t_D$ and $Eg/p$ for air, $N_2$ and $SF_6$. It is seen that in all cases $\Delta t_D$ decreases with increasing $Eg/p$. FIG. 15 is a family of curves of $\Delta t_D$ versus $Eg/p$ for $N_2$ with various values of gas pressure in the gap, the self-breakdown voltage SB being indicated in each case. The time interval $\Delta t_D$ is also a function of $d_n$. In general, $\Delta t_D$ is less when the focal point is near either of the electrodes than when it is at an intermediate point in the gap and is a minimum when near to or at the surface of the cathode, i.e. when $d_n$ has a small value. Also, minimum values of $\Delta t_D$ are obtained when $Eg/p$ is only slightly less than the self-breakdown value although there is a wide range of $Eg/p$ over which the gap may be triggered.

As stated earlier, it is desirable to reduce the resistance and inductance added to the discharge circuit by the switch to the lowest values possible. One method of accomplishing this is to connect several switches in parallel and fire them simultaneously. An arrangement of this type is shown in FIG. 2. Here the laser beam 16 is divided into three equal components 19, 20 and 21 by a ⅓ reflecting mirror 22, a ½ reflecting mirror 23 and totally reflecting mirror 24. In order to apply a pulse of minimum duration and steep wavefront to the transducer 2, the three switches must conduct as nearly as possible at the same instant. In the arrangement of FIG. 2, the maximum difference in the times at which the light pulses reach the focal points in the gaps of the three switches is the time required for light to travel from mirror 22 to mirror 24. In most cases this would be negligible since it is comparable to the switch jitter. If necessary, however, this time difference may be reduced by more complex optical systems giving equal delays from the laser to the several gaps; for example, the lengths of the paths for beams 19 and 20 may simply be increased as required to make all paths equal, using additional mirrors if needed to maintain close physical spacing between the three switches. FIG. 3 shows an alternative method for simultaneously closing a plurality of parallel switches. Very good, though not perfect, synchronization may be obtained by this method since the switches may be placed close together. By using lenses of shorter focal length only a single lens may be used between switches permitting an even closer spacing.

FIGS. 4 and 4a show modifications of the switch in which a solid or a liquid dielectric fills the gap between the electrodes 10′ and 11′. In order to reduce the distance in the dielectric through which the laser beam must pass before reaching the focal point in the gap, the support rod 8′ is made in the form of a tube through which the laser beam 16 passes. A short focal length lens 17 placed in the end of the tube near the electrode brings the beam to focus at a point in the gap.

In the modification of FIGS. 4 and 4a shown in FIG. 4b a plurality of lenses 17′ mounted on electrode 10′ bring the laser beam to focus at a plurality of points in the gap thus initiating a simultaneous parallel discharge between electrode 11′ and points on electrode 10′ between and surrounding the lenses. The multiple parallel paths lower the inductance of the switch. This arrangement may be used with gaseous as well as solid and liquid dielectrics.

FIG. 5 illustrates a a method for simultaneously firing a plurality of switches of the type shown in FIG. 4 or 4a. The beam 16 of laser 18 is divided into two equal branches by beam splitter 25. The two branches are then split into equal components for application to the four switches shown by ½ reflecting mirrors 26 and 28 and totally reflecting mirrors 27 and 29.

Figure 7:
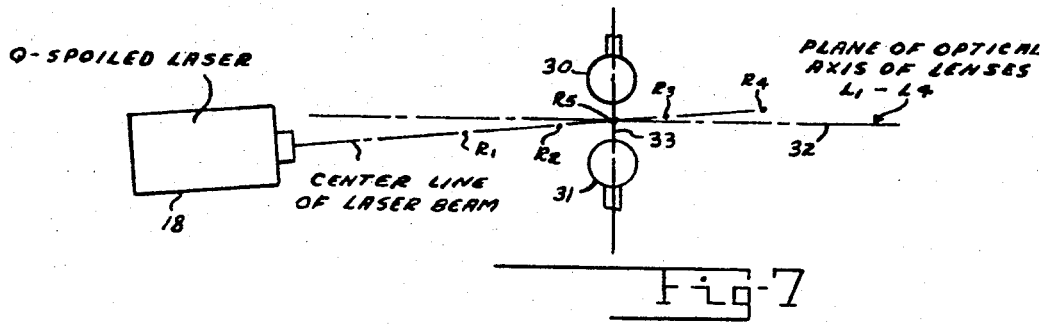
Figure 8:
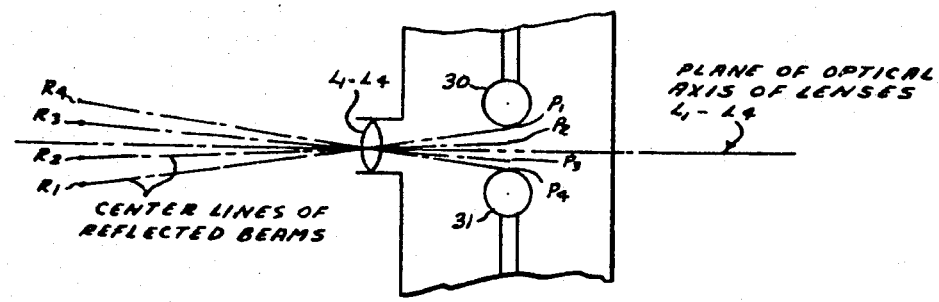

The interval $\Delta t_D$ between the arrival of laser radiation at the focal point in the gap and complete breakdown of the gap may be reduced by bringing the radiation to focus at more than one point in the gap. This is illustrated in FIGS. 6, 7 and 8 where the energy is brought to focus at four points $P_1$–$P_4$ in the gap between electrodes 30 and 31. In the arrangement shown, the optical axes of lenses $L_1$–$L_4$ pass through the center of the gap and lie in a single plane 32 normal to a line 33 connecting the centers of spheres 30 and 31. The centers of the lenses $L_1$–$L_4$ are equally spaced on a circle concentric with line 33. The projections on plane 32 of reflection points $R_1$–$R_4$ on mirrors $M_1$–$M_4$ lie on a circle concentric with line 33 at the points of intersection of this circle with the optical axes of lenses $L_1$–$L_4$. The normal at the reflection point $R_5$ on mirror $M_5$ lies in plane 32 midway between the optical axes of lenses $L_2$ and $L_3$. The center line of beam 16 of laser 18 passes through the reflecting points $R_1$–$R_5$ and is inclined slightly with respect to plane 32 so that $R_1$ and $R_2$ are below the plane and $R_3$ and $R_4$ are above the plane as shown in FIG. 7. Mirrors $M_1$–$M_4$ are tilted slightly as required to direct the center lines of the reflected beams through the centers of lenses $L_1$–$L_4$. FIG. 8 gives the superimposed views in the four planes defined by line 33 and the centers of lenses $L_1$–$L_4$. As seen in this figure, the positions of reflection points $R_1$ and $R_2$ below plane 32 cause the focal points $P_1$ and $P_2$ to fall above plane 32 in the gap and the positions of points $R_3$ and $R_4$ above plane 32 cause the corresponding focal points to fall below this plane in the gap.

It is apparent from FIG. 6 that the laser radiation travels successively greater distances in reaching focal points $P_2$, $P_3$ and $P_4$. Therefore the pulses of radiation appear at focal points $P_1$–$P_4$ in succession with extremely small intervals between pulses. This causes a progressive breakdown of the gap which is desirable. The progression should start at the cathode and, since the pulse reaches $P_1$ first, electrode 30 should be the cathode in this case.

FIGS. 9, 10 and 10a illustrate the application of high voltage switches of the type already described to a field reversal pulse forming line system. Referring to FIGS. 9 and 10, four concentric distributed constant transmission lines are used to store electrical energy for discharge through a transducer 2, in this case a wire. The lines are charged from high voltage power supply 4 through resistor 14 by closure of switch 34 having high voltage contacts 35 and grounding contacts 36 separated by insulator 37. This charges adjacent lines with opposite polarity, as indicated by the arrows, so that the net voltage across the transducer 2 is zero.

In order to discharge the line system through the transducer the ends opposite the load of one of the pairs of lines having like polarities are simultaneously short circuited. Since reflections from a short circuit are reversed in polarity, this causes reversed polarity waves to travel down the shorted lines toward the load end. When the waves reach the load end the polarities of the shorted lines reverse and become additive to the polarities of the other lines so that the voltage across the transducer 2 suddenly increases from zero to a maximum value. Assuming the transducer load to be matched in impedance to the line system, this voltage, for the four stage system shown, is twice the line charge voltage, i.e. twice the voltage of power supply 4. Also, the duration of the output voltage is twice the time required for the wave to travel the length of the line and can be made as short as a few nanoseconds.

In order that the voltage pulse applied to the transducer by the above described line system have the shortest possible rise time it is necessary that the lines be shorted simultaneously and that the reversed polarity wave front propagate uniformly down the line. Ideally the latter would require that the line be shorted around its entire circumference. This is impractical, but the ideal may be approached by simultaneous shorting at a number of equally spaced points about the circumference.

In the embodiment shown in FIGS. 9 and 10, the first and third concentric lines, counting from the center, are simultaneously shorted at four points equally spaced about their circumferences. This is accomplished by a system of high voltage switches, fundamentally the same as the switch of FIG. 1, that are simultaneously closed by a single pulse of laser radiation. Four switches, each comprising a spark gap such as formed by spherical electrodes 38 and 39, are spaced equally about the circumferences of the two lines to be shorted with the gaps in radial alignment, as best seen in FIG. 10. The beam 16 from high power Q-spoiled laser 18 is divided into four equal components radially aligned with the spark gaps by pyramidal beam splitter 40. A suitable lens system as shown is used to bring the radial beams to focus at points within the spark gaps. Because of the very small jitter of the switches, as previously pointed out, this system provides almost perfect synchronization of the shorting switches of each line. Also the interval between the shorting of the inner line and the shorting of the outer line is extremely short, being only the time required for light to travel radially the distance between the two lines. Consequently, very near to simultaneous closure of all switches is attained.

The arrangement of FIGS. 9 and 10 is suitable for use with air at atmospheric pressure in the switch gaps. Obviously, the switch housing could be made gas tight by providing a window for the laser radiation so that air under pressure, or a different gas such as $N_2$ or $SF_6$ could be used. FIG. 10a is a variation that permits the use of a liquid dielectric, although any gas could also be used. In this case the switch housing is sealed and the laser radiation is admitted through lenses mounted in the housing wall which focus the radiation at a point in the spark gap. By using lenses of short focal length, they may be placed close to the gap so that the radiation must pass through a minimum of liquid dielectric. The laser beam is split into four equal radial components as in FIGS. 9 and 10. Mirrors 41 and 42 are ½ reflecting and the end mirrors 43 and 44 totally reflecting. As in FIG. 10, a similar arrangement exists along the diameter normal to the diameter along which the section in FIG. 10a is taken.

I claim:

1. A switch for high direct voltages comprising a pair of terminals for connecting said switch into an electrical circuit, a pair of spaced electrodes connected to said terminals and forming a spark gap, the spacing of said gap being such that its self-breakdown voltage is slightly greater than the switch voltage, a laser of the type producing a pulse of coherent light of very high power and very short duration, and an optical system for bringing equal amounts of the light produced by said laser to focus at different points in said gap, said focal points lying on the line of minimum distance between said electrodes and the point nearest the negative electrode being separated therefrom by a distance lying in the range of zero to a small fraction of the minimum gap spacing.

2. A switch for high direct voltages comprising a pair of terminals for connecting said switch into an electrical circuit, a pair of spaced electrodes connected to said terminals and forming a spark gap, the spacing of said gap being such that its self-breakdown voltage is slightly greater than the switch voltage, a laser of the type producing a pulse of coherent light of very high power and very short duration, and an optical system for bringing equal amounts of the light produced by said laser to focus at different points in said gap, said focal points lying on the line of minimum distance between said electrodes and the point nearest the negative electrode being separated therefrom by a distance lying in the range of zero to a small fraction of the minimum gap spacing, and said optical system providing light transmission paths of increasingly greater lengths to said focal points in direct relation to their distances from said negative electrode whereby said equal pulses of light arrive at said focal points in succession starting with the focal point nearest the negative electrode.

3. A switch for connecting a source of electrical energy at an extremely high direct voltage to a transducer with a minimum of switching delay comprising a pair of terminals for connecting said switch into an electrical circuit including said source and said transducer, a plurality of pairs of spaced electrodes connected to said terminals and forming a plurality of spark gaps connected in parallel between said terminals, the spacing of said gaps being such that the gap self-breakdown voltage is greater than the switch voltage, and means for triggering simultaneous breakdowns in said gaps consisting of a laser of the type producing a pulse of coherent light of very high power and very short duration and an optical system for producing very high radiation power densities in said gaps by bringing equal amounts of the light produced by said laser to focus in said spark gaps at a focal point in each gap separated from the negative electrode associated with that gap by a distance lying in the range of zero to a small fraction of the minimum gap spacing, the light brought to focus in each gap being the sole breakdown triggering agent for that gap.

4. A switch for high direct voltages comprising: a pair of terminals for connecting said switch into an electrical circuit; an electrode support extending along a straight axis from one of said terminals and terminating in a first electrode concentric with said axis; a second electrode connected to the other terminal, concentric with said axis and spaced from said first electrode to form a spark gap; a solid dielectric filling said gap, said gap having a spacing such that its self-breakdown voltage is slightly greater than the switch voltage; an axial passageway through said electrode support and said first electrode; a laser having its light output directed through said passageway, said laser being of the type producing a pulse of coherent light of very high power and very short duration; and a lens of short focal length in the electrode end of said passageway for bringing said pulse of light to focus at a point in the dielectric in said gap.

5. A switch for high direct voltages comprising: a pair of terminals for connecting said switch into an electrical circuit; an electrode support extending along a straight axis from one of said terminals and terminating in a first electrode concentric with said axis; a second electrode connected to the other terminal, concentric with said axis and spaced from said first electrode to form a spark gap; means for submerging said gap in a liquid dielectric, the spacing of said gap being such that its self-breakdown voltage in said dielectric is slightly greater than the switch voltage; an axial passageway through said electrode support and said first electrode; a laser having its light output directed through said passageway, said laser being of the type producing a pulse of coherent light of very high power and very short duration; and a lens of short focal length in the electrode end of said passageway for bringing said pulse of light to focus at a point in the dielectric in said gap, said lens also serving to seal said passageway against said liquid dielectric.

6. A switch for high direct voltages comprising: a pair of terminals for connecting said switch into an electrical circuit; an electrode support extending along a straight axis from one of said terminals and terminating in a first electrode concentric with said axis; a second electrode connected to the other terminal, concentric with said axis and spaced from said first electrode to form a spark gap, the spacing of said gap being such that its self-breakdown voltage is slightly greater than the switch voltage; an axial passageway through said electrode support and said first electrode; a laser having its light output directed through said passageway, said laser being of the type producing a pulse of coherent light of very high power and very short duration; and a plurality of lenses of short focal lengths in the electrode end of said passageway for bringing said pulse of light to focus at a plurality of points in said gap.

7. Apparatus for storing a large amount of electric energy at high voltage and for discharging said energy through a transducer in a minimum interval of time, said apparatus comprising: a pulse forming line system having an even number of coextensive concentric coaxial solid dielectric transmission lines in which the outer conductor of each line, except the line of greatest diameter, is common with the inner conductor of the line of next greater diameter and in which said transducer is connected between the outer conductor of the line of greatest diameter and the inner conductor of the line of least diameter at one end of said line system; means for charging said lines to equal high potentials that are of opposite polarity for adjacent lines, whereby there results one set of lines charged to one polarity and another equal set of lines charged to the opposite polarity; means at the other end of said line system for shorting the end of each line in one of said sets of lines, said shorting means for each line comprising a plurality of shorting switches equally spaced about the circumference of the line, each of said shorting switches comprising two spaced electrodes connected to the inner and outer conductors of the line to form a spark gap, the spacing of the electrodes being such that the self-breakdown voltage of the gap is slightly greater than the voltage to which the line is charged; a laser of the type producing a pulse of coherent light of very high power and very short duration, and an optical system for bringing equal amounts of the light produced by said laser to focus in said spark gaps.

References Cited

UNITED STATES PATENTS

| | | | |
|---|---|---|---|
| 2,405,071 | 7/1946 | Tonks | 315—149 X |
| 2,920,238 | 1/1960 | Lane | 315—157 |
| 3,214,563 | 10/1965 | Ford | 219—69 |
| 3,294,970 | 12/1966 | Jenckel | 250—41.9 |

OTHER REFERENCES

Conduction Via Tracks Ionized by a Laser, by J. L. Anderson, IPM Tech. Disclosure; vol. 5, No. 12, May 1963.

DAVID J. GALVIN, *Primary Examiner.*